Figure 1:
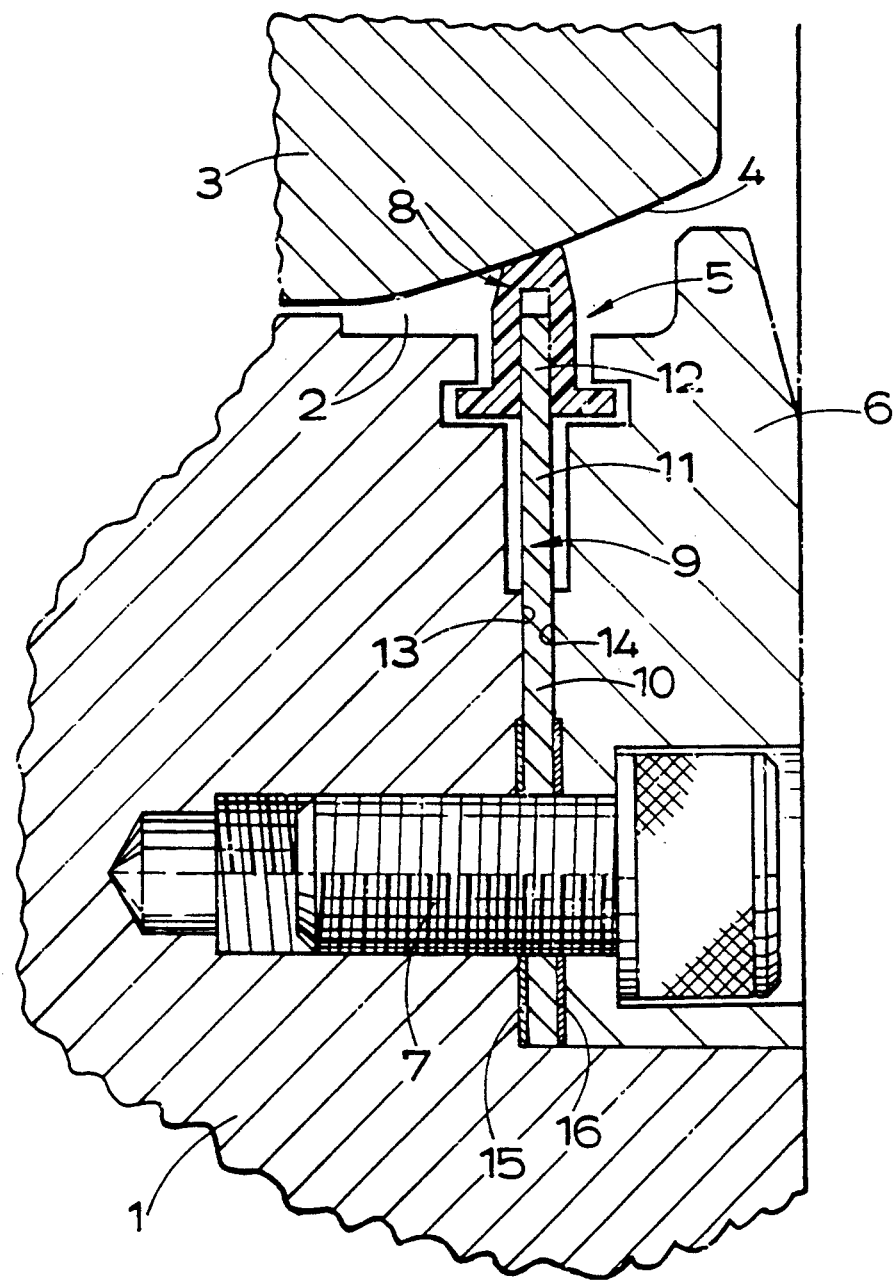

United States Patent [19]

Burton

[11] Patent Number: 4,988,076
[45] Date of Patent: Jan. 29, 1991

[54] VALVES HAVING A TURNABLE CLOSURE MEMBER SUCH AS A BUTTERFLY VALVE

[75] Inventor: Philip J. Burton, Birmingham, England

[73] Assignee: Charles Winn (Valves) Limited, England

[21] Appl. No.: 462,825

[22] Filed: Jan. 10, 1990

[30] Foreign Application Priority Data

Jan. 10, 1989 [GB] United Kingdom ................. 8900449

[51] Int. Cl.⁵ .............................................. F16K 1/22
[52] U.S. Cl. ..................................... 251/306; 251/307
[58] Field of Search ................ 251/305, 306, 307, 316

[56] References Cited

U.S. PATENT DOCUMENTS 4,005,848 2/1975 Eggleston ........................ 251/307 X
4,289,296 9/1981 Krause .................................. 251/306

FOREIGN PATENT DOCUMENTS 681649 3/1964 Canada ................................. 251/307
2034442 6/1980 United Kingdom ................ 251/306

Primary Examiner—John C. Fox
Attorney, Agent, or Firm—Leydig, Voit & Mayer

[57] ABSTRACT

A butterfly valve seat structure has a polymeric sealing head slidably supported on the radially inner portion of a flat metal washer so as to be capable of radial sliding movement on the washer, a radially outer portion of the washer being rigidly clamped between the valve housing and the seat retaining ring, and a radially intermediate portion of the washer is capable of axial movement relative to the axis of the valve passage to facilitate axial movement of the sealing head. Axial projections on the head serve to resist any tendency to blow-out of the sealing head. The combined abilities of the sealing head to move axially and radially help to provide a good sealing action against the valve disc.

8 Claims, 2 Drawing Sheets

VALVES HAVING A TURNABLE CLOSURE MEMBER SUCH AS A BUTTERFLY VALVE

This invention relates to valves having a turnable closure member such as a butterfly valve or a ball valve, and in particular to valves in which the seal assembly which seals with the closure member in the closed condition of the closure member incorporates a PTFE (polytetrafluoroethylene) seal, or a seal of a material having similar physical properties.

PTFE is a remarkable material and is frequently used in butterfly and ball valves to provide an effective seal at low temperatures. However it has certain peculiarities, one of which is that once deformed it takes some time to return to its original shape of its own accord. In valves which need to be capable of providing bi-directional sealing this can present a problem with many existing designs, since application of high pressure in one direction can result in a temporary deformation of the PTFE seal, due to the pressure-deflection of the closure member, such that on reversal of the pressure satisfactory sealing may not be achieved, at least initially.

Various attempts have been made to overcome this problem, for example confining the PTFE sealing head and applying external resilient forces to the sealing head so as to tend to 'extrude' the PTFE against the closure member. Such seal assemblies can have a large number of components which adds to the complexity and difficulties in servicing of the valve by the user. When there is a large number of seat components the possibility arises that the service engineer may install the parts in the wrong order, or one of the parts may be assembled the wrong way round.

U.S. Pat. No. 4,289,296 discloses various constructions of seal assembly comprising a polymeric sealing member moulded around, and consequently bonded to, a metal reinforcing member. In general the sealing member consists of a swingable sealing head for sealing engagement with the valve member, and a clamped root portion of T-shape in radial cross-section. The metal reinforcing member extends radially from within the head into the T-shaped root portion. This arrangement enables the sealing head to have a degree of axial movement arising from the ability of the head to swing about the junction between the head and the clamped root portion.

An object of the present invention is to provide a valve seat structure with a PTFE, or the like, sealing element which uses relatively few components, but which is capable of being arranged to provide adequate bi-directional sealing.

According to one aspect of the invention a valve having a turnable closure member for controlling fluid flow in a valve passage, comprises a valve seat assembly carried by the valve housing and arranged to effect a seal with the periphery of the closure member in the closed condition of the closure member, the valve seat assembly comprising in radial section a substantially radially inwardly extending arm of resilient material comprising a radially outer portion clamped to the valve housing, an intermediate portion which is capable of deflecting relative to the clamped portion in an axial direction of the valve (the direction of fluid flow through the valve passage), and a radially inner portion on which is carried a sealing head of PTFE, or material of similar properties, the sealing head being of substantially U-section with the base of the U engageable with the periphery of the closure member in the closed condition thereof to seal therewith, and the limbs of the U embracing the radially inner portion of the resilient arm, the arrangement being such that the sealing head is capable of axial movement relative to the valve housing at least within a predetermined range.

Such a valve seat assembly permits some axial deflection of the sealing head from its normal condition, the condition adopted by the valve seat when the closure member is in the fully open condition. Thus, when the closure member is turned to its closed condition and is thereby generally urged axially into the seat, due to the usual offsetting of the pivotal axis of the closure member from the valve axis, the seat assembly is able to accommodate the resulting axial movement of the sealing head. Furthermore, when the closed member is further deflected axially under fluid pressure forces the sealing head is able to move axially without having to expand radially, at least by any substantial amount, the axial movement of the sealing head being accommodated by resilient deflection of the intermediate portion of the arm.

Since the PTFE seal is not required to expand radially, or not by any substantial amount, the PTFE seal is not substantially deformed by movement of the closure member produced by fluid pressure forces, and accordingly the seal is able to perform satisfactorily after reversal of the pressure.

It is, however, preferred that the sealing head is capable of some radial movement on the resilient arm, to permit better centring of the PTFE seal on the closure member and to permit a degree of radial expansion and contraction. The radial movement is preferably accommodated by providing a clearance between the radially inner end of the arm and the base of the U-shaped sealing head.

The sealing head is sealed in a suitable manner to the radially inner portion of the arm, conveniently by arranging that the limbs of the U inherently grip the arm. Since it is usually necessary to machine the PTFE sealing head to produce the required shape, a gripping force is produced by machining the groove between the limbs to an appropriate undersize width in relation to the axial width of the arm.

The valve housing and/or a retaining ring for the seal assembly is preferably provided with a surface which confronts the sealing head but is axially spaced therefrom, for restricting the available axial movement of the sealing head in at least one axial direction.

The sealing head is preferably provided with at least one axially directed projection which is received with clearance in a corresponding axially extending recess in the valve housing/retaining ring to provide some resistance to blow-out of the sealing head.

Most preferably the sealing head is provided with two such axial projections directed in opposite direction, one projection being received with clearance in a first axially extending recess in the valve housing, and the second projection being received with clearance in a second axially extending recess in a retaining ring for the seal assembly, the clamped radially outer portion of the arm being clamped between the retaining ring and the valve housing.

The resilient arm is preferably provided by a substantially flat annular metal washer which may conveniently be stamped from a flat sheet. The washer is capable of being resiliently deformed in the manner of a belleville washer when the sealing head is axially deflected.

Figure 2:
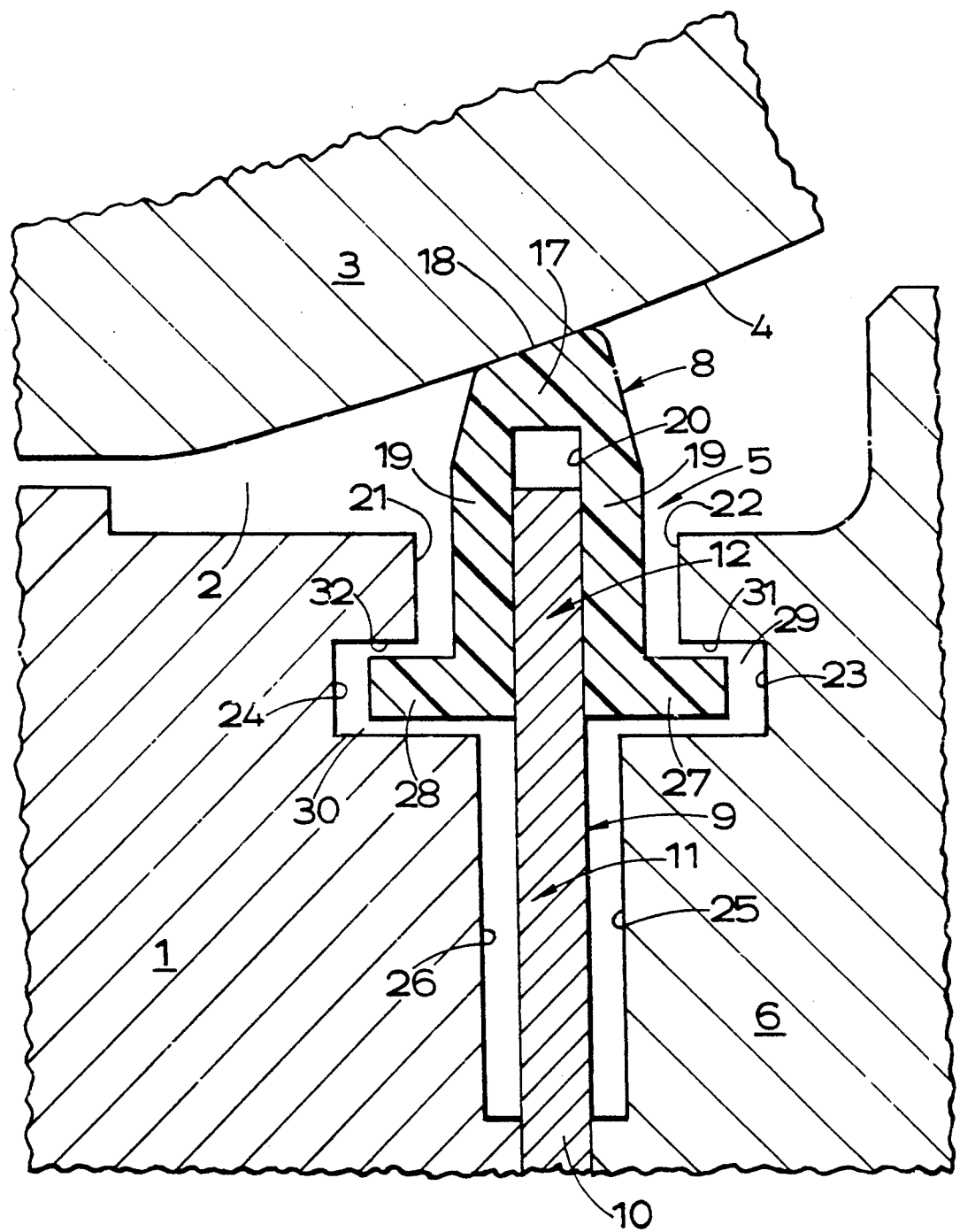

A butterfly valve in accordance with the invention will now be described, by way of example only, with reference to the accompanying drawings in which:

FIG. 1 is a longitudinal cross-sectional partial view of the butterfly valve in a fully closed, unpressurised condition; and FIG. 2 is an enlargement of part of FIG. 1.

With reference to FIG. 1, a valve housing 1 is formed with a cylindrical fluid flow passage 2 in which is pivotally mounted in conventional manner a butterfly valve disc 3. As is common practice the butterfly valve disc is substantially of the shape of a slice of a sphere, having a substantially part-spherical sealing surface 4 for sealing engagement in the closed condition of the disc with an annular seal assembly 5 carried by the housing 1. The butterfly valve disc is pivotally mounted on either a single shaft or on a pair stub shafts in well known manner, the pivotal axis desirably being offset in well-known manner both from the axis of the flow passage 2 and from the centre of curvature of sealing surface 4 (a double-offset arrangement).

The seal assembly 5 is clamped to the housing by an annular retaining ring 6 which is held by any suitable securing means. The securing means illustrated comprises a plurality of circumferentially spaced retaining screws 7 threadedly engaged with the valve housing 1.

The seal assembly comprises an annular PTFE sealing head 8 mounted on a resilient annular metal ring 9 which provides, in radial cross-section of the seal assembly 5, a radially inwardly extending arm having a clamped outer portion 10, an axially movable intermediate portion 11, and an axially movable radially inner portion 12 on which the sealing head 8 is mounted.

The radially outer portion 10 is clamped directly between opposed clamping faces 13 and 14 on the valve housing 1 and retaining ring 6 respectively, to provide positive location of the portion 10, and between sealing gaskets 15 and 16 through which the clamping screws 7 extend.

With reference to FIG. 2, the PTFE sealing head 8 is of substantially inverted U (or top hat shape) in radial section. The base 17 of the U-shape is provided with a disc contact surface 18 which is desirably substantially frusto-conical for sealing engagement with the sealing surface 4 of the disc 3. The parallel limbs 19 of the U-shape clasp between them the radially inner portion 12 of the metal ring 9, this being arranged by machining the slot 20 in the sealing head to be of slightly less axial width than the thickness of the metal ring 9. It will be seen that the limbs 19 engage with the inner portion 12 of metal ring 9 for a substantial radial depth to provide an effective seal between both limbs 19 of the sealing head and ring 9. This sealing action will tend to be enhanced by fluid pressure acting on the relevant limb 19 in the closed condition of the valve, since the relevant limb 19 will be urged axially more tightly against the metal ring 9.

In order to permit a degree of axial deflection of the sealing head 8 relative to the valve housing, to accommodate axial movement of the closed valve disc under fluid pressure forces, due to the usual deflection of the disc and pivot shaft, the surfaces 21,26 of the valve housing and retaining ring which confront the sealing head 8 and intermediate portion 11 are arranged to be axially spaced therefrom, as shown in the drawings, in the closed, non-pressurised condition of the valve.

The sealing head 8 comprises oppositely directed axial projections 27,28 which are received with radial and axial clearance in axially extending recesses 29 and 30 respectively in the retaining ring 6 and valve housing 1 respectively, surfaces 23 and 24 defining the bases of recesses 29 and 30 respectively. Sidewalls 31 and 32 which define recesses 29 and 30 respectively face radially outwards and provide abutment faces for engagement by the projections 27 and 28 respectively in the event that the sealing head 8 is subjected to very high pressures which might otherwise lead to blowing-out of the sealing head 8. The axial spacing between faces 21 and 22 is so chosen as to provide adequate room for axial displacement of the sealing head 8 in either direction from the neutral position shown in FIG. 2, yet to ensure that the sealing head projections 27,28 are unable to pass radially inwardly between faces 21,22 in any axial position of the sealing head.

I claim:

1. A valve comprising a valve housing formed with an axially extending valve passage, a valve seat assembly carried by said valve housing and circumscribing said valve passage, a turnable closure member rotatably mounted in said passage for effecting a seal with said valve seat in a closed condition of said closure member, said valve seat assembly comprising in radial section thereof a radially inwardly-extending arm of resilient material, said arm comprising a radially inner portion, a radially intermediate portion, and a radially outer portion, said outer portion being rigidly clamped to said valve housing, said radially intermediate portion being capable of deflecting relative to said outer portion to facilitate axial movement of said radially inner portion, and a sealing head of polymeric material mounted on said radially inner portion of said arm, said sealing head being of U-section comprising a base and two limbs, said base being engageable with said closure member in said closed condition of said closure member for effecting a seal therewith, and said limbs embracing said radially inner portion.

2. A valve as in claim 1 wherein said closure member is a butterfly disc member.

3. A valve as in claim 1 wherein said intermediate portion and said outer portion of said arm are devoid of polymeric material.

4. A valve as in claim 1 wherein said polymeric material is PTFE.

5. A valve as in claim 1 wherein said sealing head is radially slidably mounted on said inner portion, said base of said sealing head being normally radially spaced from said inner portion to define a radial clearance for accommodating said radial sliding movement.

6. A valve as in claim 5 wherein at least one of said sealing head limbs carries an axial projection and said valve housing is formed with an axially extending recess for receiving said axial projection, said recess being of sufficient axial depth to permit a predetermined amount of axial movement of said axial projection in said recess.

7. A valve as in claim 5 including a valve seat retaining ring, said outer portion being clamped to said housing by being held between said housing and said retaining ring, a second of said sealing head limbs carrying a second axial projection, and said retaining ring being formed with a second axially extending recess for receiving said second axial projection, said second recess being of sufficient axial depth to permit a predetermined amount of axial movement of said second axial projection in said second recess.

8. A valve as in claim 1 wherein said arm is provided by a substantially flat annular metal washer.

* * * * *